(12) United States Patent
R et al.

(10) Patent No.: US 12,481,819 B2
(45) Date of Patent: Nov. 25, 2025

(54) SYSTEM AND METHOD OF TRANSFORMING LEGACY DOCUMENTS TO XML FORMATS

(71) Applicant: HCL Technologies Limited, New Delhi (IN)

(72) Inventors: Sridhara R, Bangalore (IN); Karuppiah V, Chennai (IN); Kavitha Y, Chennai (IN); Angurajan K, Chennai (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 18/124,611

(22) Filed: Mar. 22, 2023

(65) Prior Publication Data
US 2024/0152683 A1  May 9, 2024

(30) Foreign Application Priority Data
Nov. 9, 2022 (IN) .............................. 202211063819

(51) Int. Cl.
G06F 40/143 (2020.01)
G06F 40/117 (2020.01)

(52) U.S. Cl.
CPC .......... *G06F 40/117* (2020.01); *G06F 40/143* (2020.01)

(58) Field of Classification Search
CPC .............................. G06F 40/117; G06F 40/143
See application file for complete search history.

(56) References Cited

U.S. PATENT DOCUMENTS

| | | |
|---|---|---|
| 6,565,609 B1 | 5/2003 | Sorge et al. |
| 6,578,192 B1 | 6/2003 | Boehme et al. |
| 7,165,216 B2 | 1/2007 | Chidlovskii et al. |
| 7,587,415 B2 | 9/2009 | Gaurav et al. |
| 7,614,052 B2 | 11/2009 | Wei |

(Continued)

FOREIGN PATENT DOCUMENTS

| | | |
|---|---|---|
| AU | 782134 B2 | 7/2005 |
| CN | 101980183 B | 12/2013 |

OTHER PUBLICATIONS

Jean-Pierre Chanod, Boris Chidlovskii, Hervé Dejean, Olivier Fambon, Jérôme Fuselier, Thierry Jacquin, Jean-Luc Meunier; From Legacy Documents to XML: A Conversion Framework; Research Gate; Sep. 2005.

*Primary Examiner* — Keith D Bloomquist
(74) *Attorney, Agent, or Firm* — Kendal M. Sheets

(57) ABSTRACT

A system and method of key generation for transforming legacy documents to extensible markup language (XML) formats is disclosed. The method includes extracting a plurality of attributes from an intermediate structure file of a legacy document. The method further includes transforming the intermediate structure file into a custom object model (COM) structure. The transforming may include classifying the intermediate structure file into one or more objects based on each of the plurality of attributes, logically grouping each of the one or more objects, and creating a hierarchical object tree from each of the one or more objects logically grouped in accordance with the COM structure. The method further includes converting the COM structure of the legacy document to an XML format in compliance with one or more industry standards using an XML serialization technique.

17 Claims, 14 Drawing Sheets

(56) References Cited

U.S. PATENT DOCUMENTS

| | | | |
|---|---|---|---|
| 7,937,653 B2 | 5/2011 | Dejean et al. | |
| 9,996,501 B1* | 6/2018 | Nelson | H03M 7/30 |
| 11,775,754 B1* | 10/2023 | Freundlich | G06F 40/166 |
| | | | 715/208 |
| 2002/0035619 A1* | 3/2002 | Dougherty | H04L 67/565 |
| | | | 709/219 |
| 2002/0077844 A1* | 6/2002 | Hayashi | G06Q 10/10 |
| | | | 705/343 |
| 2005/0157753 A1* | 7/2005 | Mayer | H04M 11/062 |
| | | | 370/468 |
| 2006/0150148 A1* | 7/2006 | Beckett | G06F 8/34 |
| | | | 717/109 |
| 2006/0156226 A1* | 7/2006 | Dejean | G06F 40/258 |
| | | | 715/251 |
| 2006/0271843 A1* | 11/2006 | Yarde | G06F 40/157 |
| | | | 715/234 |
| 2007/0055596 A1* | 3/2007 | Yankovich | G06Q 40/00 |
| | | | 705/35 |
| 2007/0101259 A1* | 5/2007 | Grigoriadis | G06F 40/106 |
| | | | 715/205 |
| 2009/0192956 A1* | 7/2009 | Dejean | G06F 40/103 |
| | | | 706/12 |
| 2014/0108897 A1 | 4/2014 | Boutelle et al. | |
| 2015/0370869 A1* | 12/2015 | Caruana | H04L 67/1014 |
| | | | 707/756 |
| 2019/0138965 A1 | 5/2019 | Narayanaswamy | |
| 2020/0034770 A1* | 1/2020 | Jennings | G06Q 10/06316 |
| 2020/0073997 A1* | 3/2020 | Tzirkel-Hancock | |
| | | | G06F 16/3344 |
| 2021/0312125 A1 | 10/2021 | Zhang et al. | |
| 2023/0214593 A1* | 7/2023 | Padukone | G06F 40/35 |
| | | | 704/2 |

\* cited by examiner

| Nomenclature | Part or Specification Number | Source (CAGE)* |
|---|---|---|
| Alcohol, Isopropyl | Federal Specification TT-I-735 | Commercially available |
| Cloth, Lint-Free | ......... | Commercially available |
| Cradle | 91033-10 | MASS System, A Unit of Ameron Global, Inc. (OFFR4) |

| FIG ITEM NO. | PART NUMBER | NOMENCLATURE 1 2 3 4 5 6 7 | EFE | UNITS PER ASSY |
|---|---|---|---|---|
| 1 - 1 | 21100-1 | FIRE EXTINGUSHER, LAVATORY | A | RF |

900

902 → ATA compliance xml

904 → S1000D compliance xml output

D. <u>Disassembly</u>
1. To Replace Single Brush Without Removing Lid
   a. Removal of worn brush.
      i. Depress worn brush and cut shunt wire between ring terminal and brush.

SYSTEM AND METHOD OF TRANSFORMING LEGACY DOCUMENTS TO XML FORMATS

TECHNICAL FIELD

This disclosure relates generally to legacy document transformation. More specifically, the invention relates to system and method of transforming legacy documents to xml formats.

BACKGROUND

Typical aircrafts, ships, or large equipment may include millions of parts supplied by thousands of suppliers from several countries. Once these parts reach to their destination, it may be very difficult for a technician to reassemble these parts in their original form. Therefore, to simplify task of the technician, there may be multiple types of technical manuals (also referred as legacy documents) that may include necessary details regarding parts assembling/disassembling. As these technical manuals undergo significant customization depending on the customers and/or country it is sold, it may go through regular revision updates periodically. Due to this magnitude of operational complexity, volume of information and complexity of systems and its process, the technical manuals pertaining to the aircrafts, the ships or the large equipment may run from several thousands to several hundred thousand pages.

In order to maintain an efficiency and ease of maintenance operations in Aerospace and defence (A&D), these manuals may be written as per the specifications defined in S1000D/Air Transport Association (ATA) guidelines. As after-market services and process is undergoing digital transformation, companies worldwide are looking forward to digitize the technical manuals by converting them to XML formats in-order to make them available online and accessible by different electronic media and devices. However, several problems may arise due to non-availability of native/source files, exorbitant effort, time, and cost factors associated in converting an unstructured/non-standard document into the ATA/S1000D compliant XML suitable for interactive electronic technical manual (IETM), Web publishing and the like.

Further, many aerospace and industrial organization may be suffering from several challenges, such as, the native/source file not available, only PDF inputs are available, need XML output from different input (Word, HTML, SGML), conversion from the ATA compliance to the S1000D compliance, XML available but updated with new business rules, and review for compliance and autocorrection. Furthermore, due to a large volume of technical manuals, the organizations need to convert these technical manuals into digital form. However, by examining a cost associated with conversion tool and infrastructure and a time required to convert thousands of pages of technical manuals, many organizations are delaying digitization process.

Therefore, there exists a need to develop a time efficient and cost-effective automated system and method that provides solution to the aforementioned drawback.

SUMMARY OF INVENTION

In one embodiment, a method of transforming legacy documents to extensible markup language (XML) formats is disclosed. The method may include extracting a plurality of attributes from an intermediate structure file of a legacy document. The method may further include transforming the intermediate structure file into a custom object model (COM) structure. The transforming may include classifying the intermediate structure file into one or more objects based on each of the plurality of attributes, logically grouping each of the one or more objects, and creating a hierarchical object tree from each of the one or more objects logically grouped in accordance with the COM structure. The method may further include converting the COM structure of the legacy document to an XML format in compliance with one or more industry standards using an XML serialization technique.

In another embodiment, a system of transforming legacy documents to extensible markup language (XML) formats is disclosed. The system may include a processor and a memory communicatively coupled to the processor. The memory may store processor-executable instructions, which, on execution, may causes the processor to extract a plurality of attributes from an intermediate structure file of a legacy document. The processor-executable instructions, on execution, may further cause the processor to transform the intermediate structure file into a custom object model (COM) structure. For transforming the intermediate structure file, the processor-executable instructions, on execution, may further cause the processor to classify the intermediate structure file into one or more objects based on each of the plurality of attributes, logically grouping each of the one or more objects, and creating a hierarchical object tree from each of the one or more objects logically grouped in accordance with the COM structure. The processor-executable instructions, on execution, may further cause the processor to convert the COM structure of the legacy document to an XML format in compliance with one or more industry standards using an XML serialization technique.

In yet another embodiment, a non-transitory computer-readable storage medium is disclosed. The non-transitory computer-readable storage medium has computer-executable instructions stored thereon of transforming legacy documents to extensible markup language (XML) formats. The computer-executable instructions may cause a computer comprising one or more processors to perform operations comprising extracting a plurality of attributes from an intermediate structure file of a legacy document. The operations may further include transforming the intermediate structure file into a custom object model (COM) structure. The transforming may include classifying the intermediate structure file into one or more objects based on each of the plurality of attributes, logically grouping each of the one or more objects, and creating a hierarchical object tree from each of the one or more objects logically grouped in accordance with the COM structure. The operations may further include converting the COM structure of the legacy document to an XML format in compliance with one or more industry standards using an XML serialization technique.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIG. 10A illustrates an exemplary content of the legacy document in nested bulleted list form, in accordance with an exemplary embodiment.

FIG. 10B illustrates generated XML format files in compliance with ATA standard and S1000D standard, respectively, corresponding to the table as shown in FIG. 10A, in accordance with an exemplary embodiment.

FIG. 11C illustrates generated XML format files in compliance with S1000D standard and ATA standard corresponding to the exemplary diagram as shown in FIG. 11A, in accordance with an exemplary embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
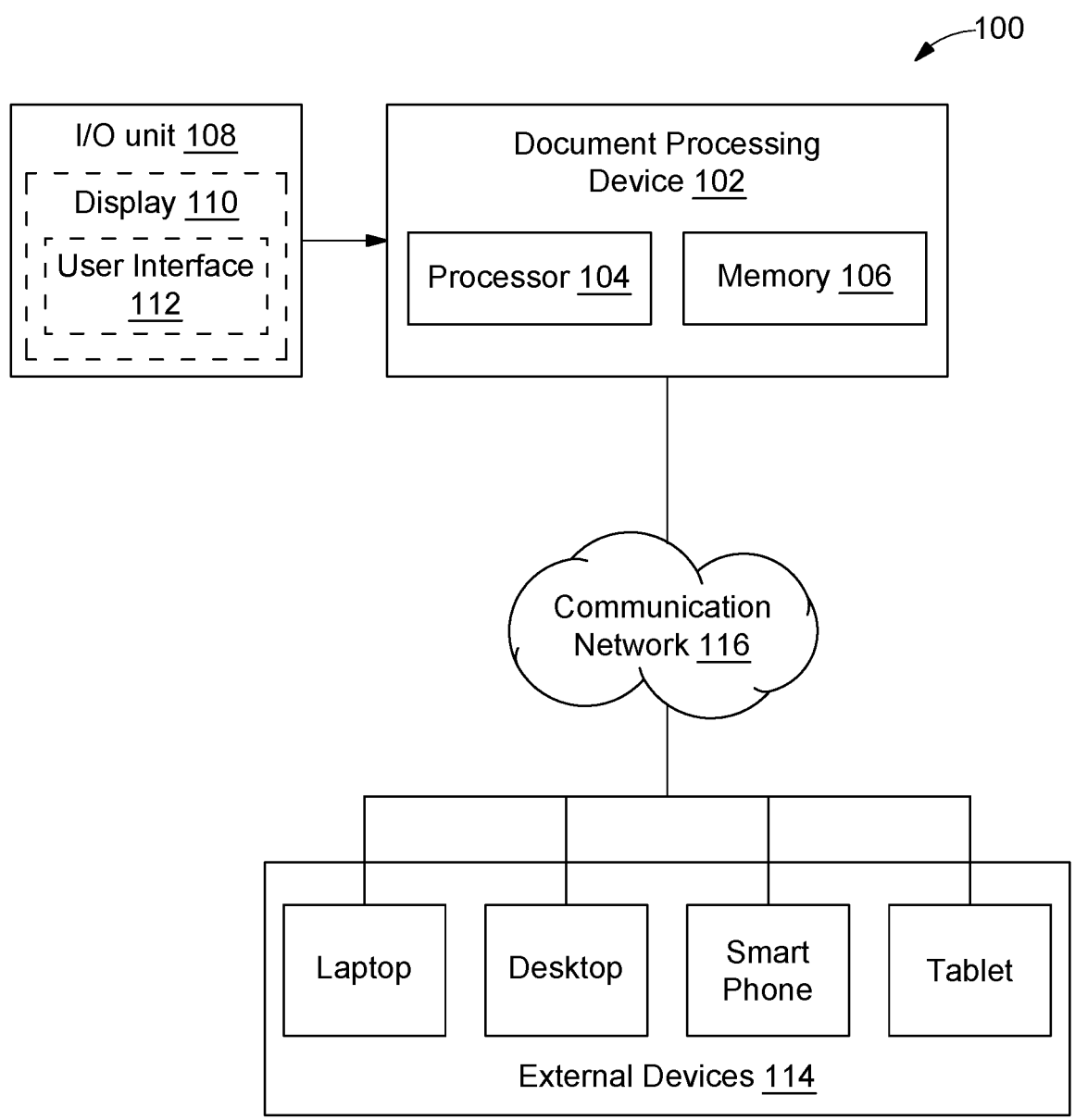
FIG. 1 is an environment diagram illustrating a system of transforming legacy documents to extensible markup language (XML) formats, in accordance with an embodiment.

Referring now to FIG. 1, an environment diagram of a system 100 for transforming legacy documents to extensible markup language (XML) formats is illustrated, in accordance with an embodiment. The system 100 may include a document processing device 102 that may be configured to transform legacy documents into XML formats. Examples of the document processing device 102 may include, but are not limited to a server, a desktop, a laptop, a notebook, a tablet, a smartphone, a mobile phone, an application server, or the like. The legacy document may be a technical manual that may include, but not limited to, an aircraft installation and/or training technical manual, a ship installation and/or training technical manual, a military equipilient installation and/or training technical manual, a military vehicle installation and/or training technical manual, or a machinery installation and/or training technical manual.

Additionally, the legacy document may be readily available in a predefined format (for example, a portable document format (PDF). Therefore, in order to transform the legacy document, the document processing device 102 may be configured to create a custom object model (COM) which may further be used to convert the legacy document from the predefined format to the XML format in compliance with one or more industry standards. The one or more industry standards may be, for example, an IPsec 2200 Air Transport Association (ATA) standard, an AeroSpace and Defense (ASD) S1000D standard, a Military (MIL) standard, or a Darwin Information Typing Architecture (DITA) standard. The process of creating the COM is explained in greater detail in conjunction with FIG. 2.

The document processing device 102 include a processor 104 that is communicatively coupled to a memory 106 which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access Memory (SRAM).

The memory 106 may store instructions that, when executed by the processors 104, cause the processor 104 to transform the legacy documents to the XML formats. As will be described in greater detail in conjunction with FIG. 2 to FIG. 11 (11A-11C), in order to transform the legacy documents, the processor 104 in conjunction with the memory 106 may perform various functions including extracting a plurality of attributes from an intermediate structure file of the legacy document, transforming the intermediate structure file into the COM structure, and converting the COM structure of the legacy document to the XML format.

The memory 106 may also store various data (e.g., contents of legacy documents, data related to plurality of attributes associated with the legacy documents, data related to one or more industry standards, transformed legacy documents, etc.) that may be captured, processed, and/or required by the document processing device 102. The memory 106 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.). The memory 106 may further include various modules that enable the document processing device 102 to transform legacy documents to XML formats. These modules are explained in detail in conjunction with FIG. 2.

The document processing device 102 may interact with a user via an input/output unit 108. In particular, the document processing device 102 may interact with the user via a user interface 112 accessible via the display 110. Thus, for example, in some embodiments, the user interface 112 may enable the user to select at least one legacy document from a set of legacy documents for transforming into the XML format. Further, in some embodiments, the document processing device 102 may render results (e.g., a generated XML format file) to end-user via the user interface 112.

The system 100 may also include one or more external devices 114. In some embodiments, the document processing device 102 may interact with the one or more external devices 114 over a communication network 116 for sending or receiving various data. Examples of the external devices 114 may include, but are not limited to, computer, tablet, smartphone, and laptop. The communication network 116, for example, may be any wired or wireless network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
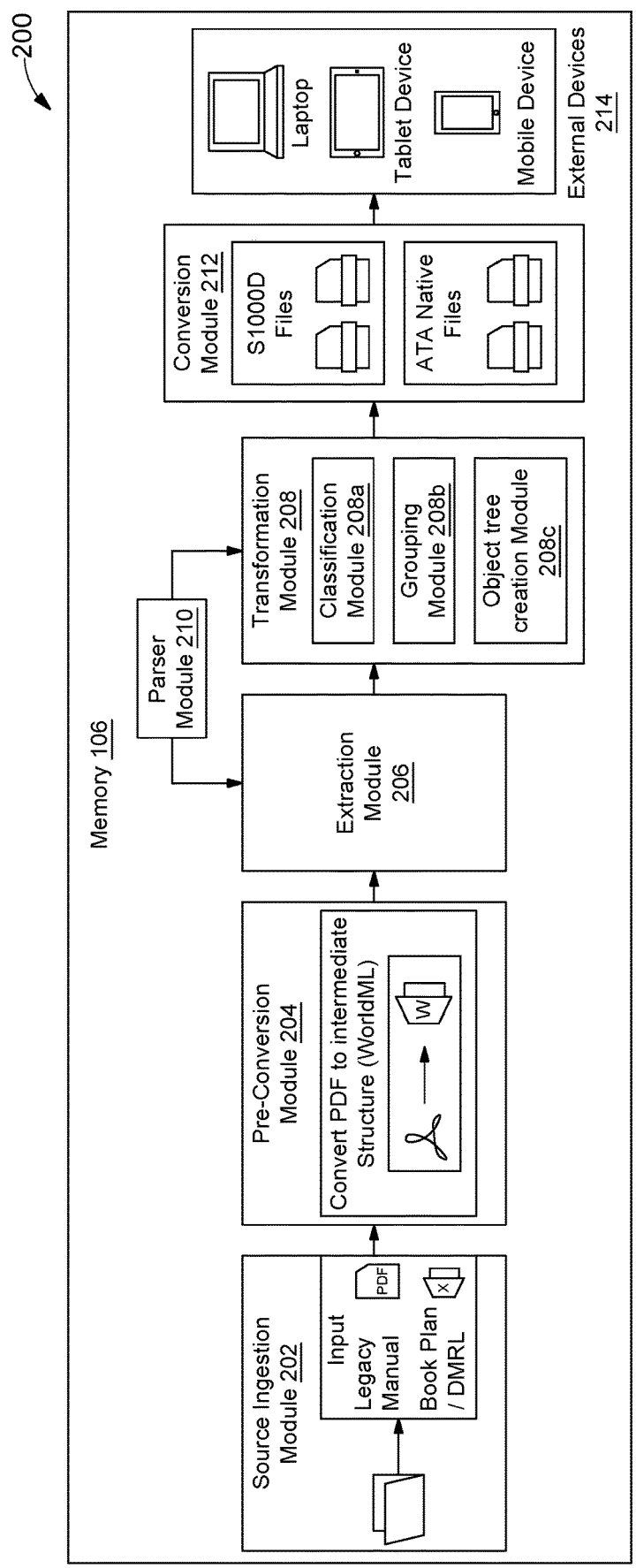
FIG. 2 is a block diagram illustrating various modules within a memory of a document processing device configured to transform legacy documents to XML formats, in accordance with an embodiment.

Referring now to FIG. 2, a block diagram 200 of various modules within the memory 106 of document processing device 102 configured to transform legacy documents to XML formats is illustrated, in accordance with some embodiments of the present disclosure. The memory 106 includes a source ingestion module 202, a pre-conversion module 204, an extraction module 206, a transformation module 208, a parser module 210, and a conversion module 212.

In order to transform the legacy document to the XML formats, initially, the source ingestion module 202 may receive the legacy document from a user via the input/output unit 108. In particular, the document processing device 102 may interact with the user via the user interface 112 accessible via the display 110. In some embodiments, the user interface 112 may enable the user to select at least one legacy document & its data module requirement list (DMRL) and/or book plan to structurally transform content of the legacy document into XML output formats in compliance with one or more industry standards (for example, ATA, S1000D, MIL, and DITA standard output formats). The legacy document received from the source ingestion module 202 may be a technical manual of distinct types that may have a plurality of pages. For example, the legacy document received may be an aircraft installation and/or training technical manual, a ship installation and/or training technical manual, a military equipment installation and/or training technical manual, a military vehicle installation and/or training technical manual, or a machinery installation and/or training technical manual. It should be noted that the legacy document may be in a predefined format (for example, a PDF).

Once the legacy document is received, the pre-conversion module 204 may be configured to convert the legacy document into the intermediate structure file. In an embodiment, the legacy document may be in the PDF format which may be converted into the intermediate structure file i.e., a word markup language (ML) file. As will be appreciated by those skilled in the art, the legacy document may be converted into the wordML file by any of the existing tools available in the market.

Further, the extraction module 206 may be configured to extract a plurality of attributes from the intermediate structure file. In an embodiment, the plurality of attributes may be extracted by a parser module 210. The parser module 210 may parse at least one content of the intermediate structure file to identify the plurality of attributes from each of the at least one content. The plurality of attributes may include heading of the at least one content, sub-heading of the of the at least one content, type of header and footer used within the at least one content, number of tables within the at least one content, numbered lists within the at least one content, number of figures within the at least one content, and type of formatting used within the at least one content.

Further, the transformation module 208 may transform the intermediate structure file into a custom object model (COM) structure. In order to transform the intermediate structure file into the COM structure, the transformation module 208 may include a classification module 208a, a grouping module 208b, and an object tree creation module 208c.

The classification module 208a may be configured to classify the intermediate structure file into one or more objects. In some embodiments, the classification may be performed by tagging of one or more objects in each of the at least one content of the intermediate structure file based on the plurality of attributes and nature of each of the at least one content. The one or more objects may include a section within the at least one content of the intermediate structure file, list items within the section of the at least one content, paragraphs within each of the list items, notes, warning or caution contents, and graphic contents. The nature of the at least one content may be a content that includes a warning, a caution, or a note information. In some embodiments, the nature of the at least one content may be identified by the parser module 210. This is further explained in conjunction with FIG. 4. Once the intermediate structure file is classified into the one or more objects, the grouping module 208b may logically group each of the one or more objects.

The object tree creation module 208c may create a hierarchical object tree from each of the one or more objects logically grouped in accordance with the COM structure. The COM structure is illustrated in conjunction with FIG. 5. It should be noted that the intermediate structure file may be transformed into the COM structure using an OpenXML library and a computer programming language.

Once the intermediate structure file is transformed into the COM structure, the conversion module 212 may convert the COM structure of the legacy document to the XML format in compliance with one or more industry standards using an XML serialization technique. The XML serialization is a technique to write any in-memory object data into XML format. In some embodiments, the COM structure may be converted to a standard generalized markup language (SGML) format in compliance with the industry standards such as, but not limited to, ATA standard, S1000D standard, MIL standard, or DITA standard. Further, the corresponding XML output format files may be viewed and downloaded by external devices 214 (for example, a laptop, a tablet device, and a mobile device).

It should be noted that all such aforementioned modules 202-210 may be represented as a single module or a combination of different modules. Further, as will be appreciated by those skilled in the art, each of the modules 202-210 may reside, in whole or in parts, on one device or multiple devices in communication with each other. In some embodiments, each of the modules 202-210 may be implemented as dedicated hardware circuit comprising custom application-specific integrated circuit (ASIC) or gate arrays, off-the-shelf semiconductors such as logic chips, transistors, or other discrete components. Each of the modules 202-210 may also be implemented in a programmable hardware device such as a field programmable gate array (FPGA), programmable array logic, programmable logic device, and so forth. Alternatively, each of the modules 202-210 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Figure 3:
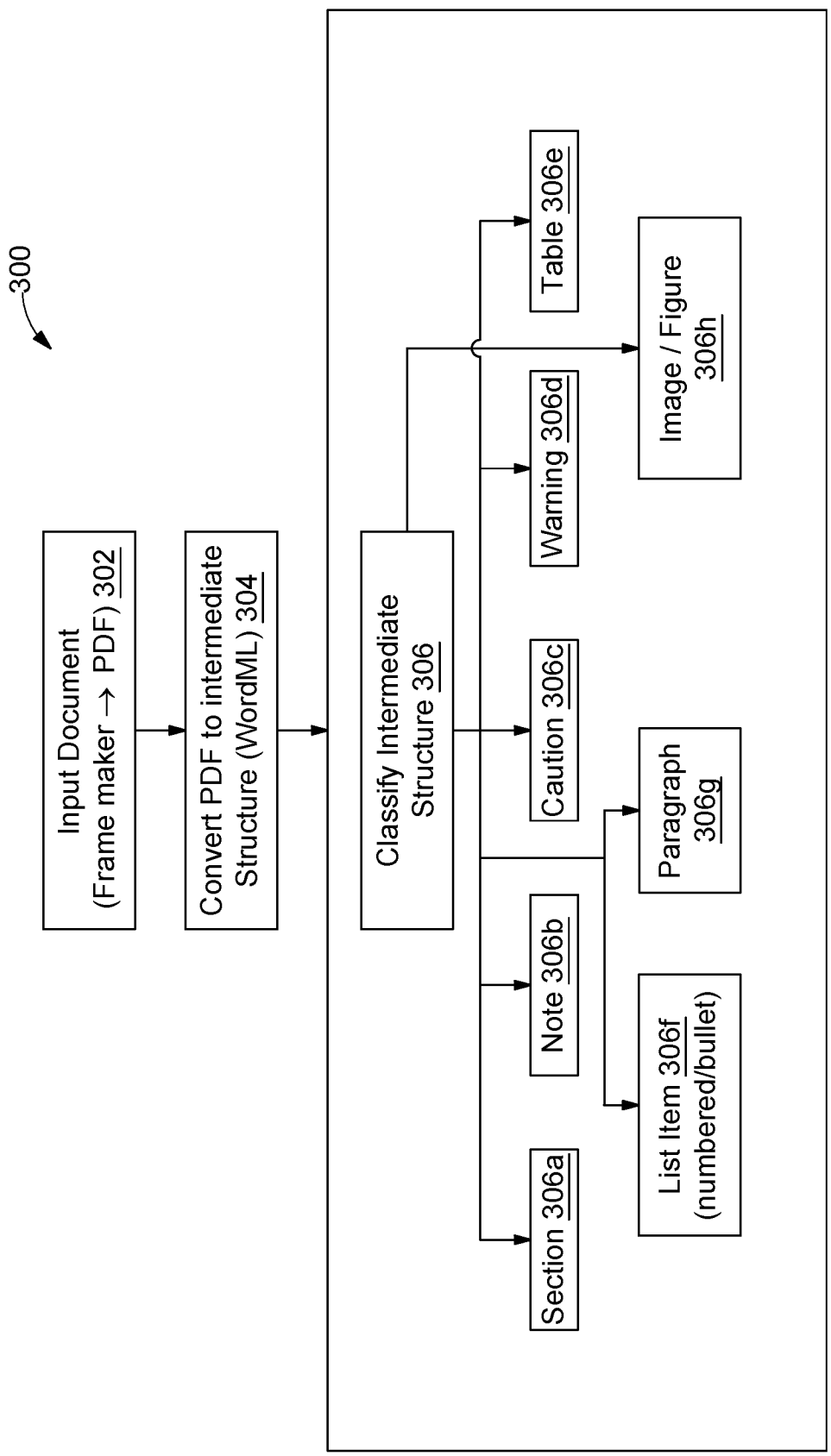
FIG. 3 is a process flow of classifying intermediate structure file into one or more objects, in accordance with an embodiment

Referring now to FIG. 3, is a process flow 300 of classifying intermediate structure file into one or more objects is illustrated, in accordance with an embodiment. At block 302, an input file may be received by the document processing device 102. The input file may be a legacy document in a PDF format. In some embodiments, the document processing device 102 may receive the legacy document as per requirement of DMRL (in case of S1000D transformation) and book plan (in case of ATA native file transformation). The DMRL and the book plan may include original equipment manufacturer (OEM) originator code, manufacturer code, information code, or information code variant details. These details may be required to decide which document type definition (DTD)/S1000D schema to be used and what content has to be transformed from the input file into output SGML/XML formats.

At block 304, the PDF file of legacy document may be converted into intermediate structure file i.e., a wordML file. It should be noted that a word document has an underlying language of wordML. In the wordML, each of a plurality of attributes (for example, image, bullet list, numbered list, table, or formatting used like bold, underline) visible may be wrapped in w:p (paragraph) tag. In some embodiments, each of the plurality of attributes may be extracted from the intermediate structure file by parsing a content of the intermediate structure file. An OpenXML library and a C programming language may be used for parsing the content of the intermediate structure file (i.e., wordML file).

At block 306, the intermediate structure file may be classified into one or more objects, for example, as shown in FIG. 3, the intermediate structure file may be classified into a section 306*a*, a note 306*b*, a caution 306*c*, a warning 306*d*, a table 306*e*, a list item (numbered/bullet) 306*f*, a paragraph 306*g*, and image/FIG. 306*h*. The one or more objects may be further logically grouped to create a hierarchical object tree in accordance with the COM structure.

Figure 4:
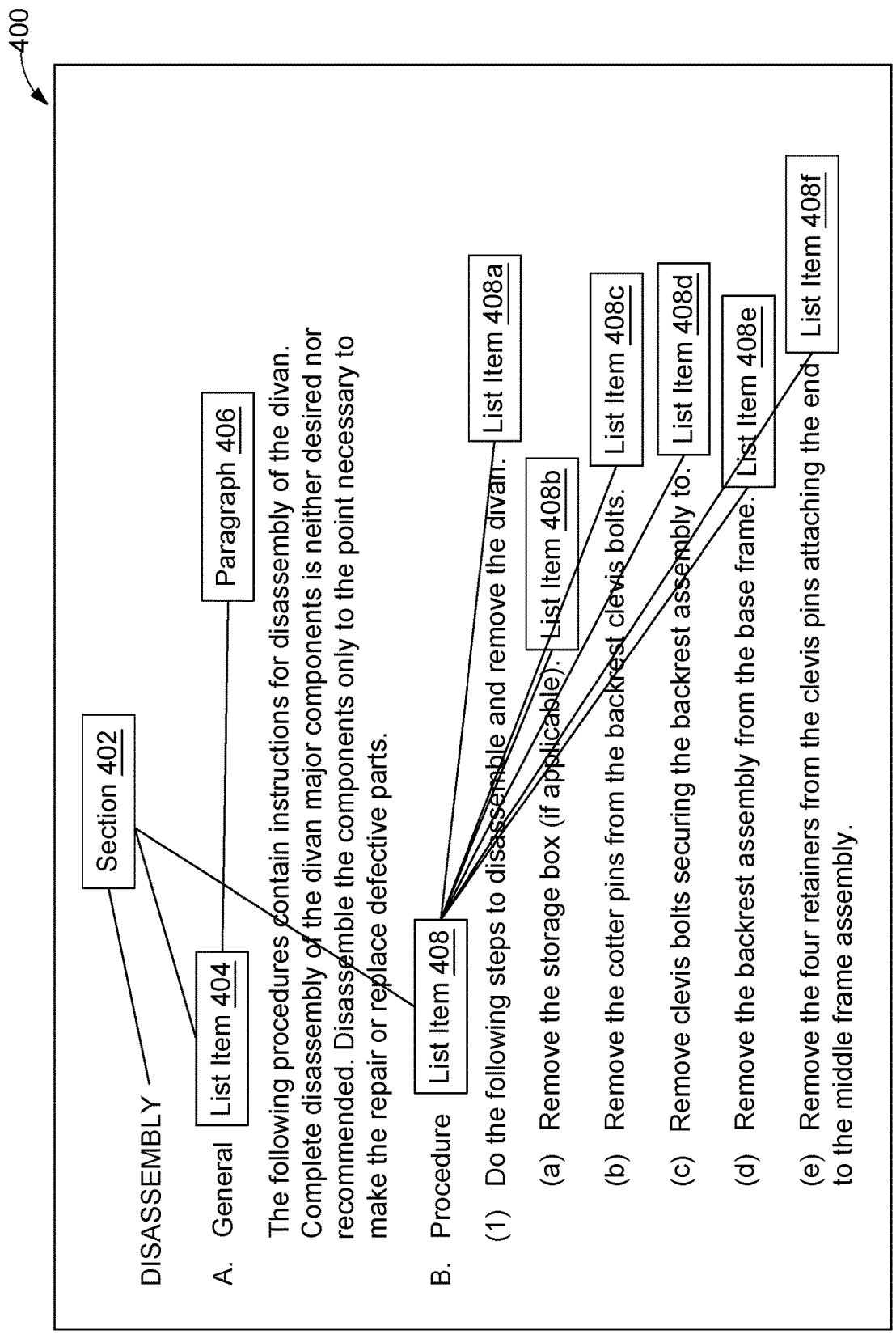
FIG. 4 illustrates tagging of one or more objects in an exemplary content of the legacy document, in accordance with an embodiment.

Referring now to FIG. 4, illustrates tagging of one or more objects in an exemplary content 400 of the legacy document. As mentioned earlier, to transform the intermediate structure file into the COM structure, firstly, the intermediate structure file may be classified into the one or more objects. Thus, for classification, each of a different content available in the intermediate structure file may be required to correctly tagged with the one or more objects. It should be noted that the tagging may be done based on the plurality of attributes and nature of the content within the intermediate structure file of the legacy document.

For example, as depicted in the exemplary content 400 of FIG. 4, for tagging based on the plurality of attributes, firstly a word 'DISASSEMBLY' may be identified as heading of the content and based on the identification, tagging it with a section 402. Similarly, a word 'General' may be identified as a sub-heading of the content and then based on the identification, tagging it with a list item 404. Additionally, a context within the sub-heading may be identified as sentence and then based on the identification, tagging it with a paragraph 406. In a similar way, a word 'Procedure' may be identified as another sub-heading within the same content and based on the identification, tagging it with a list item 408. It may be noted that there may be a multiple list items within the single list item. For example, the list item 408 may include a list item 408*a*, a list item 408*b*, a list item 408*c*, a list item 408*d*, a list item 408*e*, a list item 408*f*.

The tagging based on the nature of content may include identification of precautionary information from each of the content of the intermediate structure file. Based on identification, tagging the content having precautionary information with the one or more objects. For example, the legacy document providing instructions to perform 'Flight Test Conditions' along with precautionary information may be tagged with objects, such as, caution, warning, and notes. It should be noted that the nature of the content (for example, a content which may include precautionary information) may be identified by the parser module 210. The parser module 210 may be capable of applying intelligence on each of the content in order to identify the nature of the content and further classify the content of the intermediate structure file into one or more objects i.e., caution, warning, and notes.

The identification of the content along with formatting is also important to properly wrap the content into right tags. For example, the legacy document providing instructions to perform 'Flight Test Conditions' with caution, warning and notes, or a statement and/or a paragraph that talks about precautionary information before performing a set of procedures must be identified correctly and wrap in the correct tags as per the industry standards (for example, ATA, or S1000D standards). If such precautionary information is wrongly tagged, then there may be a chance of severe consequences. Once the content of the legacy document is correctly tagged with the one or more objects, each of the one or more objects may further be logically grouped to form a hierarchical object tree in accordance with the COM structure.

Figure 5:
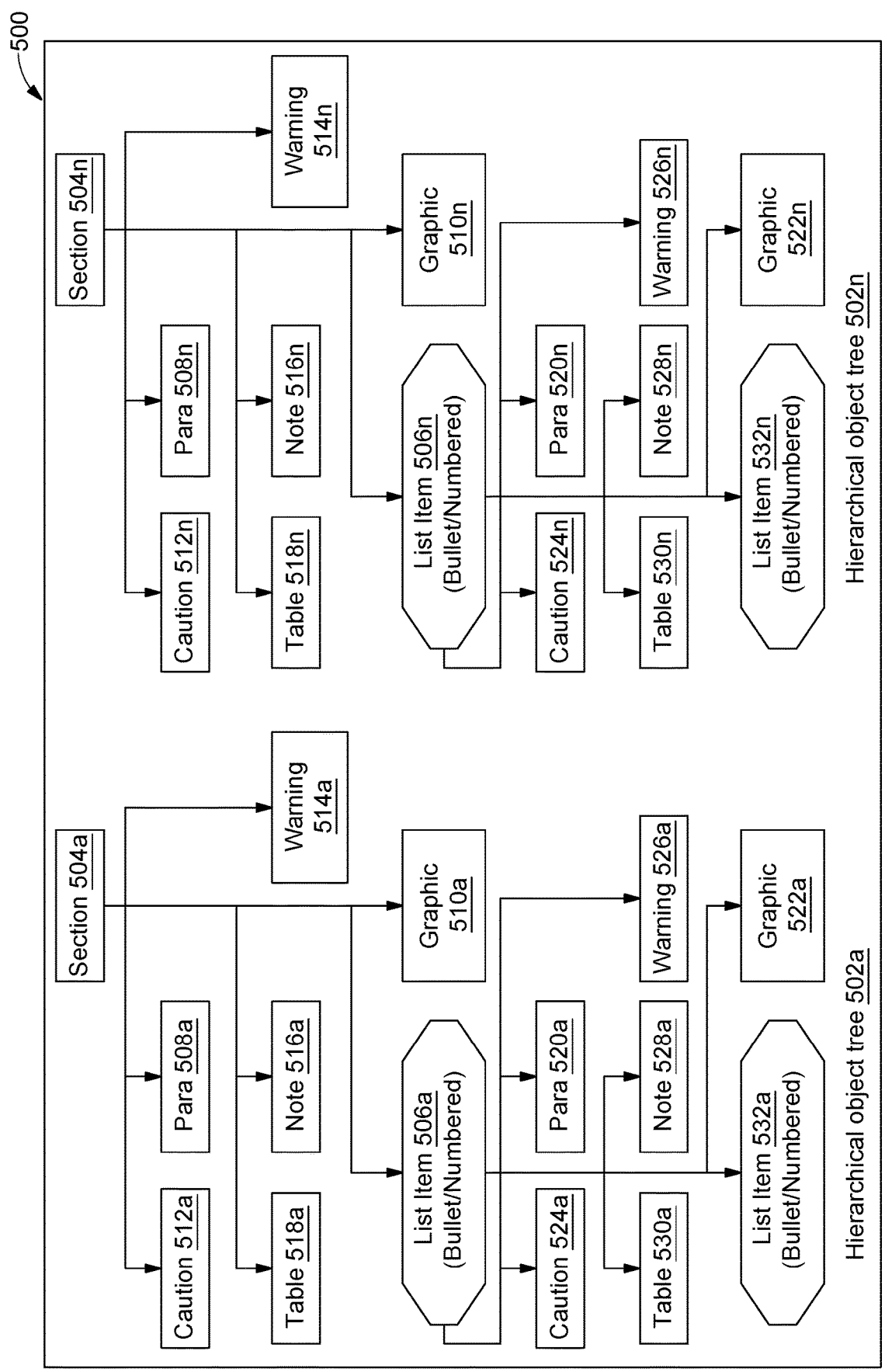
FIG. 5 illustrates a custom object model structure of a hierarchical object tree, in accordance with an embodiment.

As depicted in FIG. 5, the COM structure 500 may include a hierarchical object tree 502a. The hierarchical object tree 502a may be created from each of the one or more objects that may include a section 504a, a list item 506a, a paragraph 508a, a graphic 510a, a caution 512a, a warning 514a, a note 516a, a table 518a. The list item 506a may further be classified into a paragraph 520a, a graphic 522a, a caution 524a, a warning 526a, a note 528a, a table 530a. The list item 506a may further be sub-classified into a list item 532a. It may be noted that the COM structure 500 may include "N" number of hierarchical object tree that may be created from one or more different content present within the legacy document.

For example, the COM structure 500 may include a hierarchical object tree 502n created from each of the one or more objects of other type of content that is not previously used. The hierarchical object tree 502n created from the one or more objects includes a section 504n, a list item 506n, a paragraph 508n, a graphic 510n, a caution 512n, a warning 514n, a note 516n, a table 518n. The list item 506n may further be classified into a paragraph 520n, a graphic 522n, a caution 524n, a warning 526n, a note 528n, a table 530n. The list item 506n may further be sub-classified into a list item 532n.

In one embodiment, the hierarchical object tree 502a created in accordance with the COM structure 500 may be used for transformation of the legacy document to the XML format in compliance with one type of industry standard (for example, S1000 standard). In another embodiment, the hierarchical object tree 502n created in accordance with the COM structure 500 may be used for transformation of the legacy document to the XML format in compliance with other type of industry standard (for example, ATA standard), depending on requirements mentioned in the DMRL and the book plan.

Figure 6:
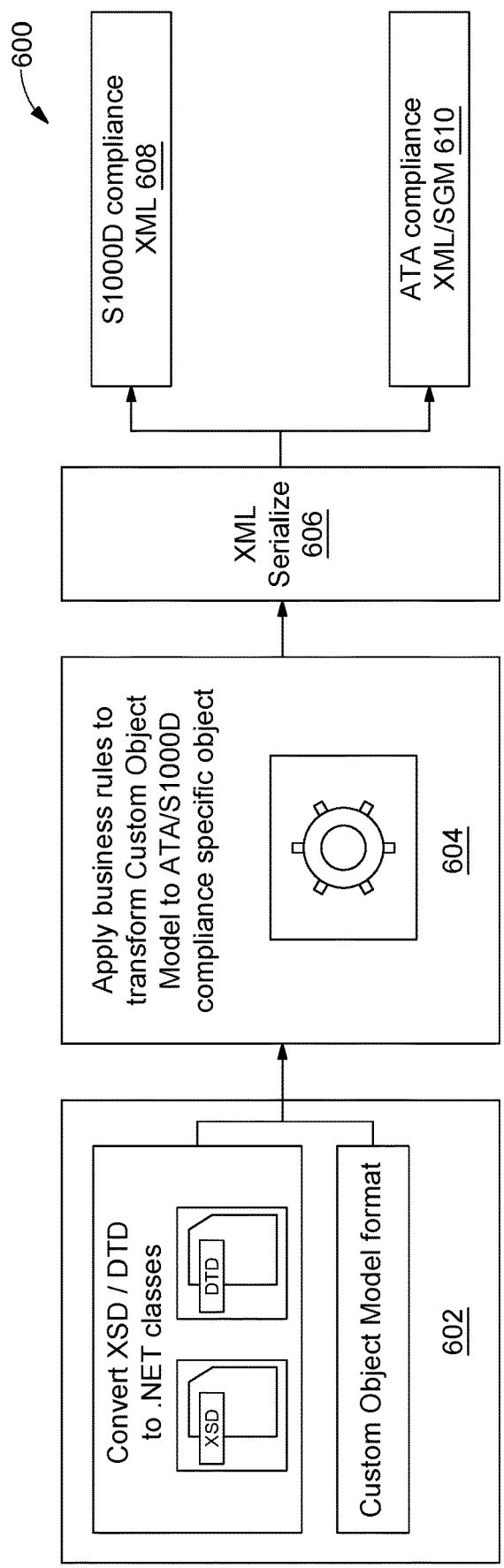
FIG. 6 is a process flow for converting COM structure file into XML formats, in accordance with an embodiment.

Referring now to FIG. 6, is a process flow 600 for converting COM structure file into XML formats, in accordance with an embodiment. Once the intermediate structure file is transformed into the COM structure by the techniques already discussed above in conjunction with FIG. 2 to FIG. 5. The conversion module 212 of the document processing device 102 may further convert the COM structure of the legacy document to an XML format in compliance with one or more industry standards using an XML serialization technique.

In order to convert the COM structure to the XML format in compliance with the one or more industry standards, initially at block 602, a .NET object file may be generated for each of the hierarchical object tree created in accordance with the COM structure. In addition to the .NET object files, the conversion module 212 may also receive a converted .NET classes from the legacy document as per the requirement mentioned in the DMRL (in case of S1000D transformation) and book plan (in case of ATA native file transformation). The DMRL may be in XML schema definition (XSD) format and a document type definition (DTD) format defined as per the S1000D and ATA standard. For example, if the requirement is to transform the legacy document into the XML format as per the S1000D standard and ATA standard, then the XSD and DTD format file may be converted into .NET classes.

At block 604, one or more business rules may be applied to transform the COM structure into the XML format in compliance with the ATA/S1000D standards. In particular, the business rules may help in selecting appropriate .NET classes that may be processed to transform the COM structure to S1000D/ATA standards in compliance with output XML and SGM format as per the requirement using the XML serialization technique 606. In some embodiments, a generated S1000D standard output XML format file 608 may be validated against corresponding S1000D schema. Similarly, a generated ATA standard output SGML/XML format 610 files may be validated against corresponding DTD file.

Figure 7:
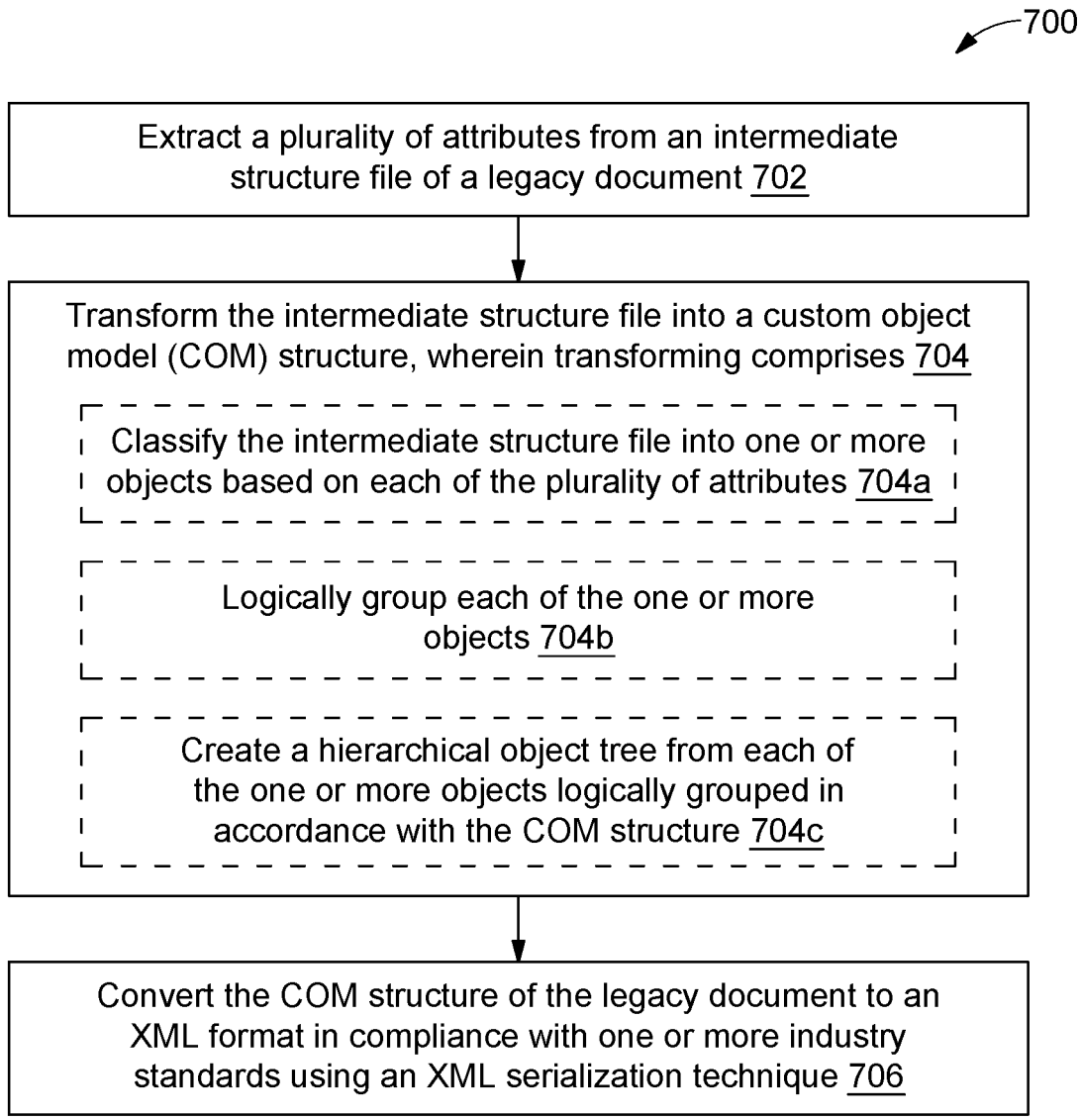
FIG. 7 is a flowchart of a method for transforming legacy documents to XML formats, in accordance with an embodiment.

Referring now to FIG. 7, a flowchart of a method 700 for transforming legacy documents to XML formats is illustrated, in accordance with an embodiment. All the steps 702-706 may be performed by the modules 202-212 of the document processing device 102. Initially, a legacy document may be received. In some embodiments, the legacy document may be received by the source ingestion module 202. The received legacy document may be in a predefined format i.e., in a PDF format. The legacy document may further be converted into the intermediate structure file. The intermediate structure file corresponds to a wordML file.

Once the legacy document is converted into the intermediate structure file, then at step 702, a plurality of attributes may be extracted from an intermediate structure file of a legacy document. In some embodiments, the plurality of attributes may be extracted by parsing at least one content of the intermediate structure file associated with the legacy document and further identifying the plurality of attributes from each of the at least one content based on parsing. The plurality of attributes may include heading of the at least one content, sub-heading of the of the at least one content, type of header and footer used within the at least one content, number of tables within the at least one content, numbered lists within the at least one content, number of figures within the at least one content, and type of formatting used within the at least one content.

At step 704, the intermediate structure file may be transformed into a custom object model (COM) structure. In order to transform the intermediate structure, the step 704 further includes sub-steps 704a, 704b, and 704c. At sub-step 704a, the intermediate structure file may be classified into one or more objects based on each of the plurality of attributes. In some embodiments, the classification may be done by tagging of one or more objects in each of the at least one content of the intermediate structure file based on the plurality of attributes and nature of each of the at least one content. The one or more objects may include a section within the at least one content of the intermediate structure file, list items within the section of the at least one content, paragraphs within each of the list items, notes, warning or caution contents, and graphic contents within the at least one content. At sub-step 704b, each of the one or more objects may be logically grouped. Further at sub-step 704c, a hierarchical object tree may be created from each of the one or more objects in accordance with the COM structure.

Once the intermediate structure file is transformed into a COM structure, then at step 706, the COM structure of the legacy document may be converted to an XML format in compliance with one or more industry standards using an XML serialization technique. The one or more industry standards may be at least one of: iSpec 2200 ATA standard, ASD S1000D standard, MIL standard, or DITA standard. In some embodiments, for converting the COM structure into to the XML format in compliance with the one or more industry standards, a .NET object file for may be generated for each of the hierarchical object tree created in accordance with the COM structure, and further the .NET object file associated with the COM structure may be transformed to the XML format in compliance with the one or more industry standards using the XML serialization technique.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figures 8A, 8B:
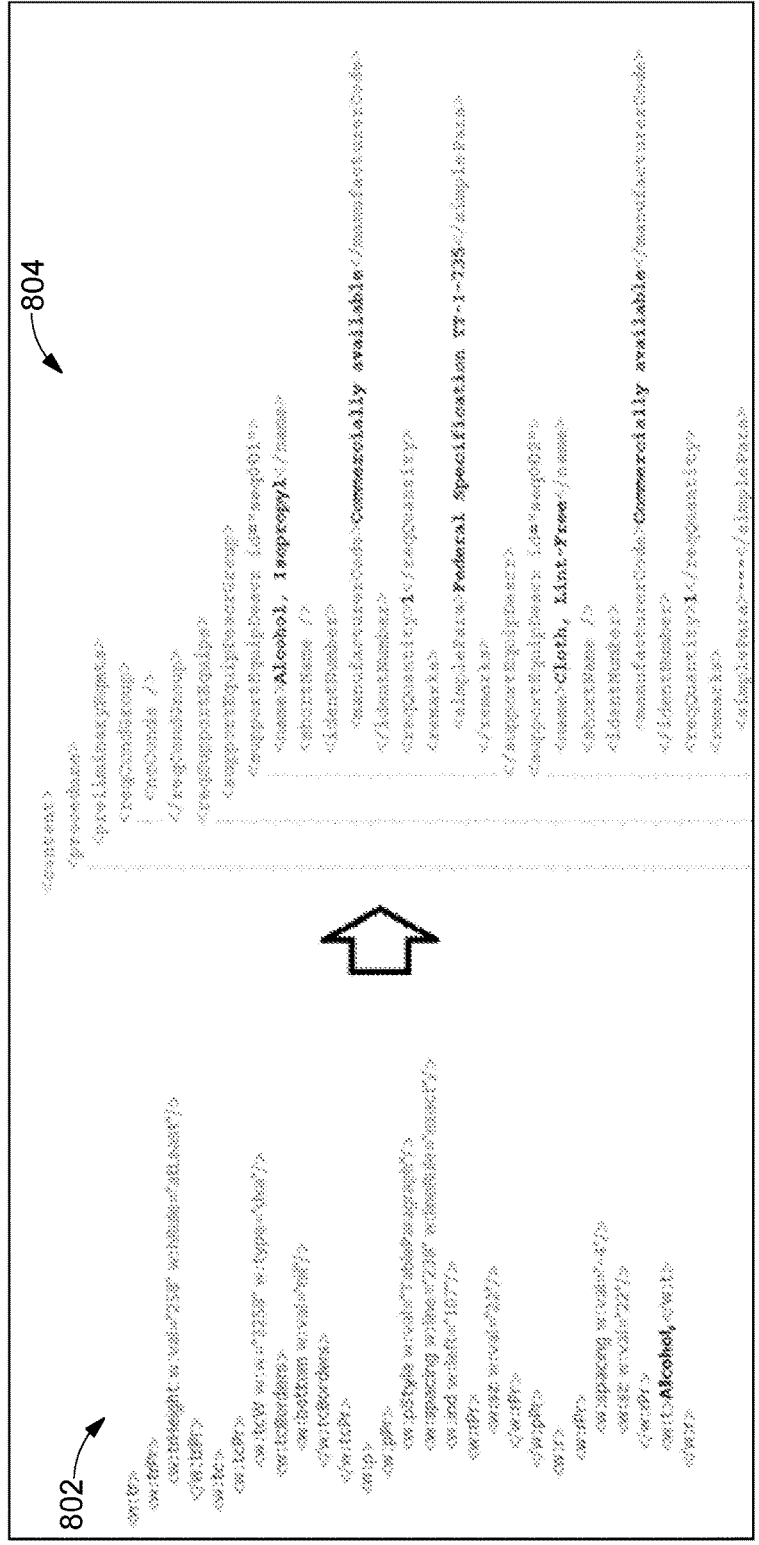
FIG. 8A illustrates an exemplary table within the legacy document, in accordance with an exemplary embodiment.
FIG. 8B illustrates transformation of intermediate structure file to XML format in compliance with S1000D standard corresponding to the table as shown in FIG. 8A, in accordance with an exemplary embodiment.

Referring now to FIG. 8A, an exemplary table 800 within the legacy document is illustrated, in accordance with an exemplary embodiment. The exemplary table 800 may be in a pdf format that includes information related to repair tools and materials. For example, first column of the table 800 may include names of material nomenclature, second column of the table 800 may include part or specification number of materials, and a third column may include source of repair tools and materials.

In some embodiments, the exemplary table 800 of the legacy document may be converted into the XML format in compliance with one or more industry standards as per the requirement. The complete process of transforming the legacy document into the XML format is already explained in conjunction to FIG. 1 to FIG. 7.

Figure 8C:
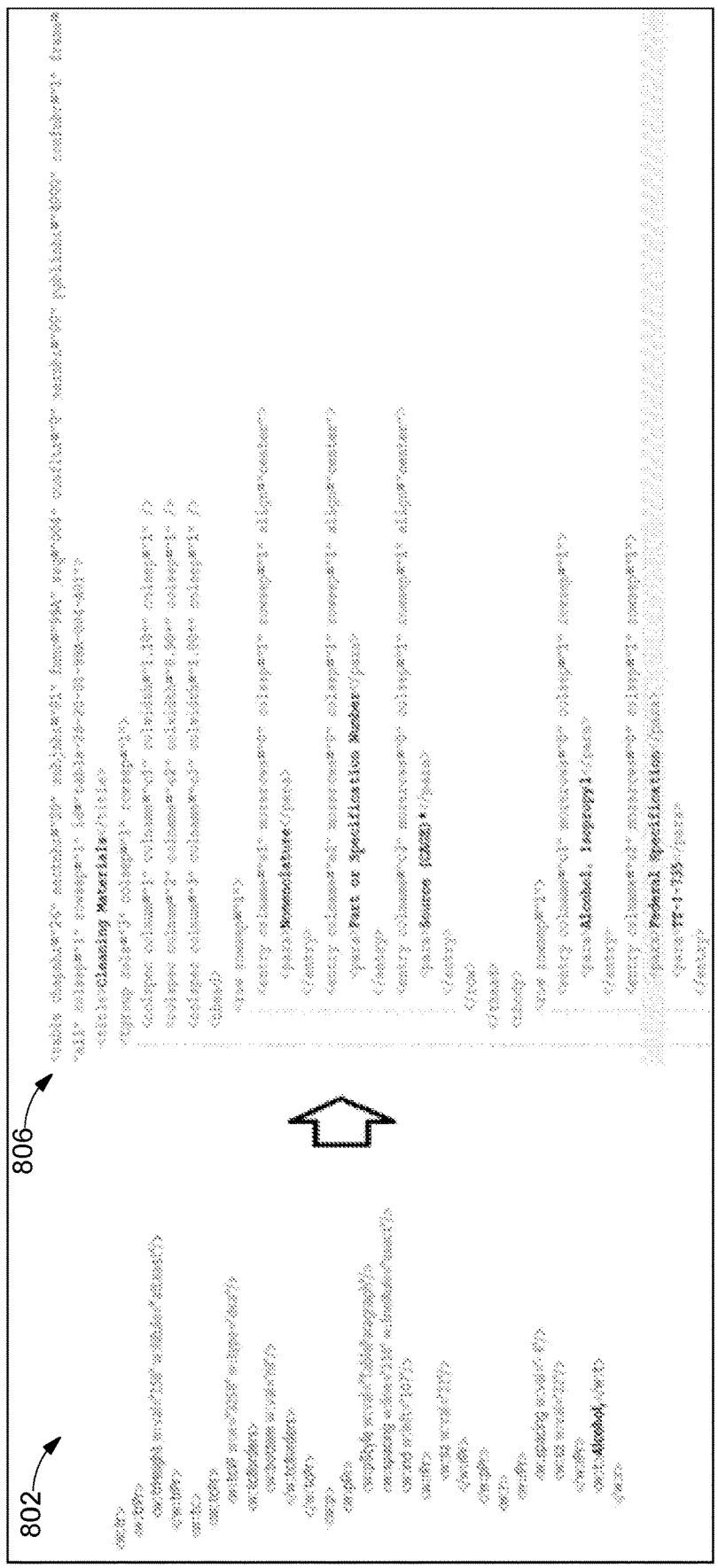
FIG. 8C illustrates transformation of intermediate structure file to XML format in compliance with ATA standard corresponding to the table as shown in FIG. 8A, in accordance with an exemplary embodiment.

In an exemplary embodiment, referring now to FIG. 8B, which illustrates transformation of intermediate structure file to XML format in compliance with S1000D standard. The intermediate structure file 802 may be obtained by converting the table 800 from a pdf format to a wordML format. Further, the intermediate structure file 802 may be transformed into the COM structure (not shown). The COM structure may further be converted into the XML format in compliance with S1000D standard 804, as shown in FIG. 8B. Additionally, the intermediate structure file 802 obtained from the table 800 may also be converted into XML format in compliance with ATA standard 806, as depicted in FIG. 8C.

Figures 9A, 9B:
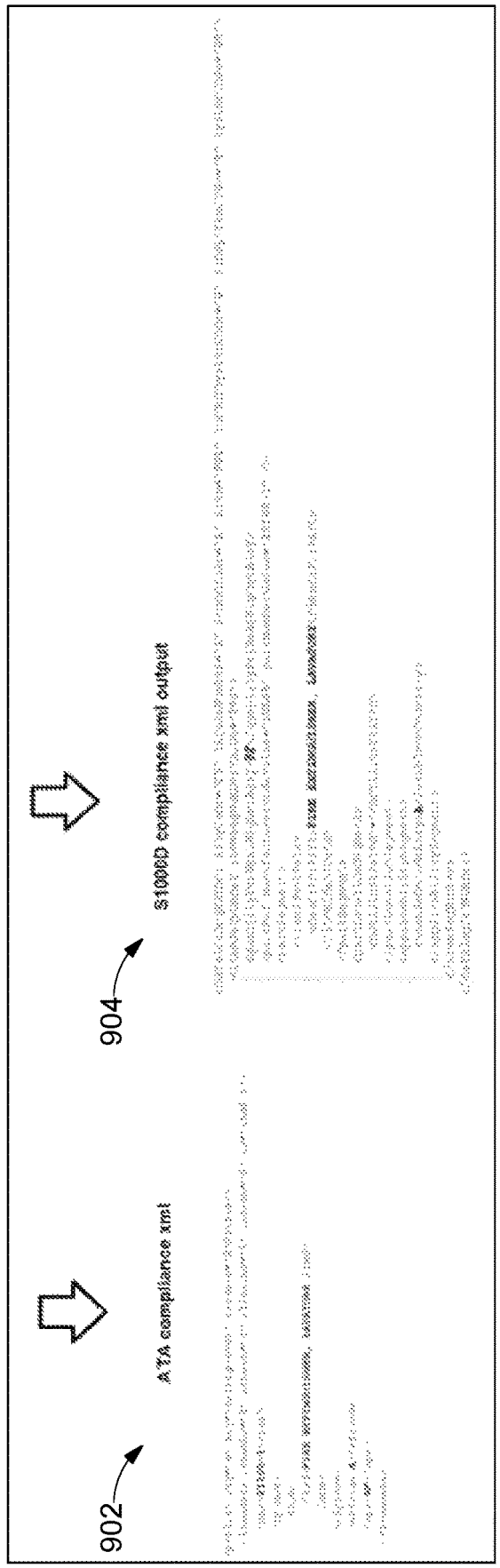
FIG. 9A illustrates another exemplary table within the legacy document, in accordance with an exemplary embodiment.
FIG. 9B illustrates generated XML format files in compliance with ATA standard and S1000D standard, respectively, corresponding to the table as shown in FIG. 9A, in accordance with an exemplary embodiment.

Referring now to FIG. 9A, is another exemplary table 900 within the legacy document is illustrated, in accordance with another exemplary embodiment. The exemplary table 900 may be in a pdf format that includes information related to illustrated parts list (IPL) of tools. For example, a first column of the table 900 may include figure item number, a second column of the table 900 may include part number, a third column of the table 900 may include airline part number, and a fourth column of the table 900 may include details of nomenclature. A generated XML format file in compliance with an ATA standard 902 and a S1000D standard 904 corresponding to the table 900 is illustrated in FIG. 9B.

In accordance with another exemplary embodiment, referring now to FIG. 10A, which illustrates an exemplary content 1000 of legacy document in nested bulleted list form. A generated XML format file in compliance with S1000D standard 1002 and ATA standard 1004 corresponding to the content 1000 is illustrated in FIG. 10B.

Figure 11A:
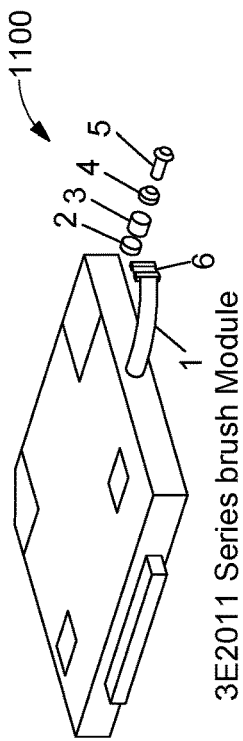
FIG. 11A illustrates an exemplary diagram from the legacy document, in accordance with an exemplary embodiment.
Figure 11B:
FIG. 11B illustrates transformation of the exemplary diagram as shown in FIG. 11A into intermediate structure file, in accordance with an exemplary embodiment.
Figure 11C:
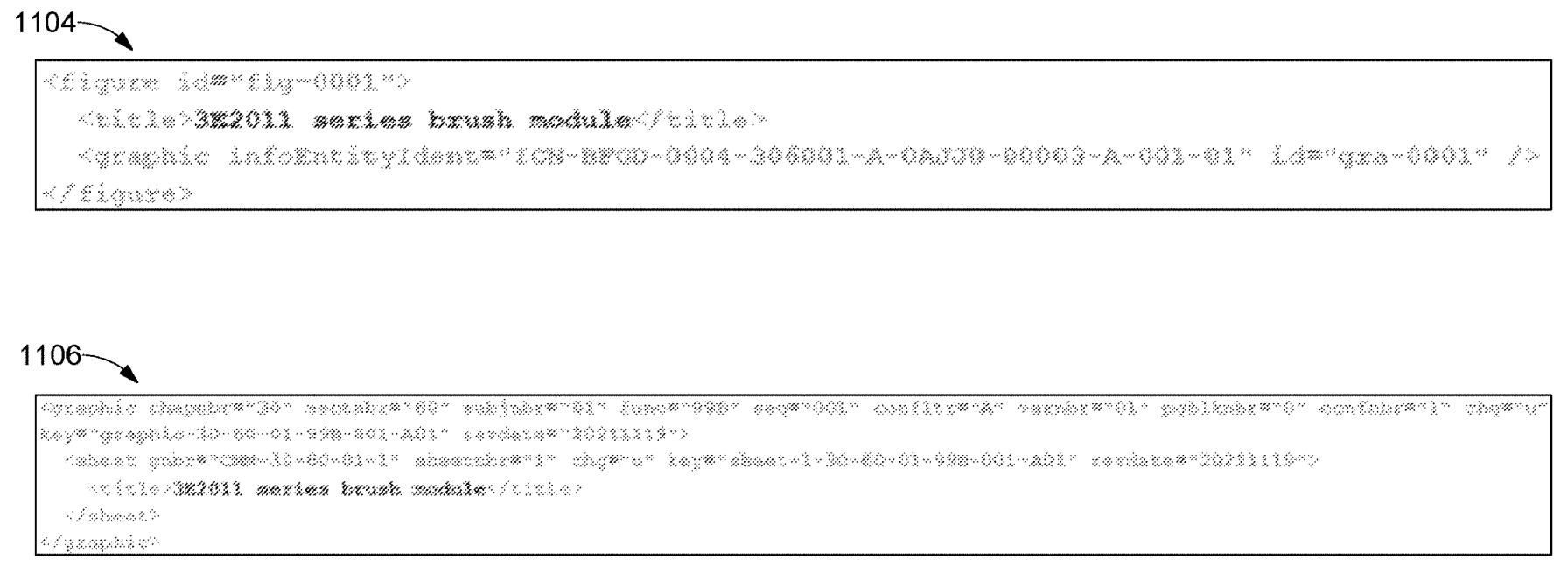

In accordance with another exemplary embodiment, referring now to FIG. 11A, which illustrates an exemplary diagram 1100 from the legacy document. The exemplary diagram 1100 may be of a 3E2011 series brush module. In order to convert the diagram 1100 into the XML output format, firstly an intermediate structure file i.e., a wordML file 1102 of the diagram 1100 may be created. The wordML file 1102 of the diagram 1100 is illustrated in FIG. 11B. The wordML file 1102 may further be transformed into a COM structure (not shown). The COM structure may further be used to obtain an XML format file in compliance with S1000D standard 1104 and an XML output format in compliance with ATA standard 1106 corresponding to the diagram 1100, as illustrated in FIG. 11C.

As will be appreciated by those skilled in the art, the techniques described in the various embodiments discussed above are not routine, or conventional, or well understood in the art. The techniques discussed above provide for transforming legacy documents to XML formats. By the disclosed techniques, over 70% of the legacy manual conversion activities may be automated and over 90% of the review/audit activities may be automated. Further, the disclosed techniques may reduce a lot of time during manual effort at a technical manual/publication level and may save millions of dollars at a program/organization level. Further the disclosed techniques may be compatible with different editors and a Common Source Data Base (CSDB). The disclosed techniques may be capable of modernizing legacy manuals having large number of pages, savings on effort/ faster timer to market, savings on commercial spend, first time right (FTR), and on time delivery (OTD). Moreover, the disclosed techniques may be applied in every industry adhering to S1000D, ATA, MIL and DITA standards.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 12:
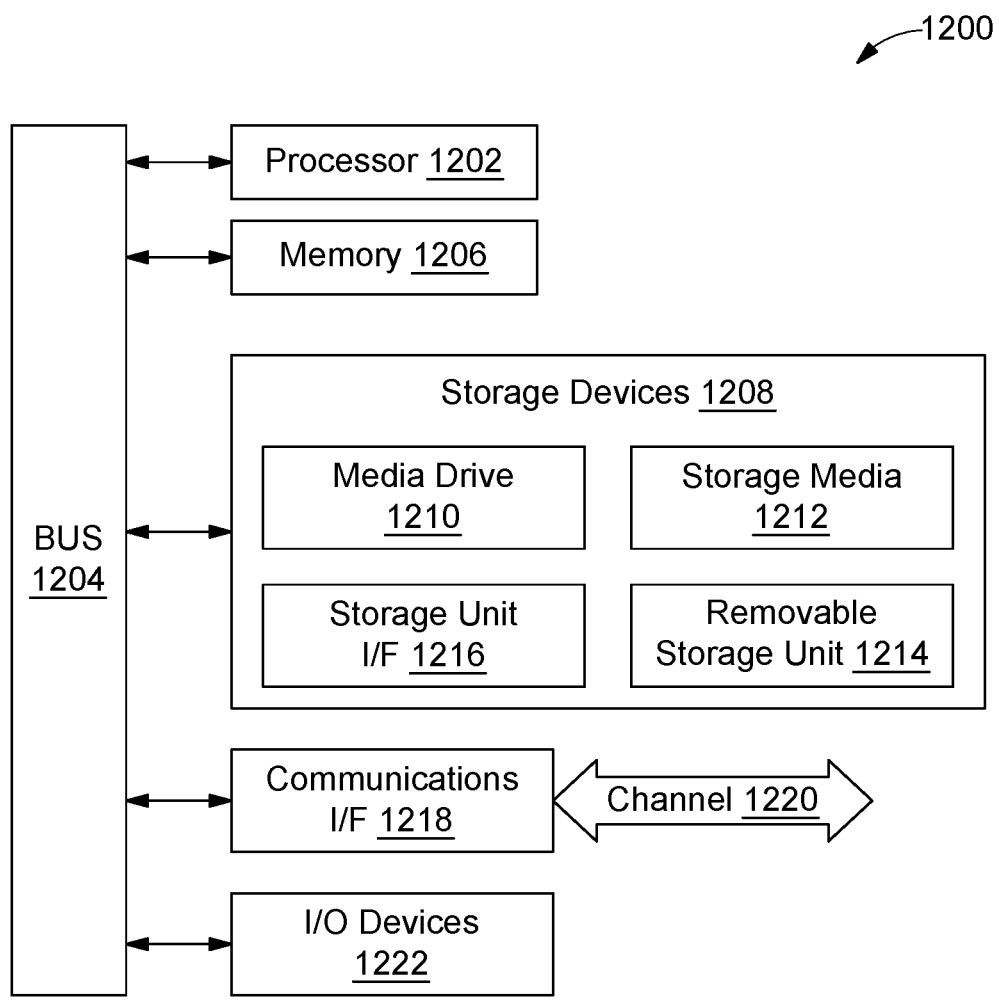
FIG. 12 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 12, an exemplary computing system 1200 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1200 may represent, for example, a user device such as a desktop, a laptop, a mobile phone, personal entertainment device, DVR, and so on, or any other type of special or general-purpose computing device as may be desirable or appropriate for a given application or environment. The computing system 1200 may include one or more processors, such as a processor 1202 that may be implemented using a general or special purpose processing engine such as, for example, a microprocessor, microcontroller or other control logic. In this example, the processor 1202 is connected to a bus 1204 or other communication medium. In some embodiments, the processor 1202 may be an Artificial Intelligence (AI) processor, which may be implemented as a Tensor Processing Unit (TPU), or a graphical processor unit, or a custom programmable solution Field-Programmable Gate Array (FPGA).

The computing system 1200 may also include a memory 1206 (main memory), for example, Random Access Memory (RAM) or other dynamic memory, for storing information and instructions to be executed by the processor 1202. The memory 1206 also may be used for storing temporary variables or other intermediate information during execution of instructions to be executed by the processor 1202. The computing system 1200 may likewise include a read only memory ("ROM") or other static storage device coupled to bus 1204 for storing static information and instructions for the processor 1202.

The computing system 1200 may also include storage devices 1208, which may include, for example, a media drive 1210 and a removable storage interface. The media drive 1210 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 1212 may include, for example, a hard disk, magnetic tape, flash drive, or other fixed or removable medium that is read by and written to by the media drive 1210. As these examples illustrate, the storage media 1212 may include a computer-readable storage medium having stored therein particular computer software or data.

In alternative embodiments, the storage devices 1208 may include other similar instrumentalities for allowing computer programs or other instructions or data to be loaded into the computing system 1200. Such instrumentalities may include, for example, a removable storage unit 1214 and a storage unit interface 1216, such as a program cartridge and cartridge interface, a removable memory (for example, a flash memory or other removable memory module) and memory slot, and other removable storage units and interfaces that allow software and data to be transferred from the removable storage unit 1214 to the computing system 1200.

The computing system 1200 may also include a communications interface 1218. The communications interface 1218 may be used to allow software and data to be transferred between the computing system 1200 and external devices. Examples of the communications interface 1218 may include a network interface (such as an Ethernet or other NIC card), a communications port (such as for example, a USB port, a micro-USB port), Near field Communication (NFC), etc. Software and data transferred via the communications interface 1218 are in the form of signals which may be electronic, electromagnetic, optical, or other signals capable of being received by the communications interface 1218. These signals are provided to the communications interface 1218 via a channel 1220. The channel 1220 may carry signals and may be implemented using a wireless medium, wire or cable, fiber optics, or other communications medium. Some examples of the channel 1220 may include a phone line, a cellular phone link, an RF link, a Bluetooth link, a network interface, a local or wide area network, and other communications channels.

The computing system 1200 may further include Input/Output (I/O) devices 1222. Examples may include, but are not limited to a display, keypad, microphone, audio speakers, vibrating motor, LED lights, etc. The I/O devices 1222 may receive input from a user and also display an output of the computation performed by the processor 1202. In this document, the terms "computer program product" and "computer-readable medium" may be used generally to refer to media such as, for example, the memory 1206, the storage devices 1208, the removable storage unit 1214, or signal(s) on the channel 1220. These and other forms of computer-readable media may be involved in providing one or more sequences of one or more instructions to the processor 1202 for execution. Such instructions, generally referred to as "computer program code" (which may be grouped in the form of computer programs or other groupings), when executed, enable the computing system 1200 to perform features or functions of embodiments of the present invention.

In an embodiment where the elements are implemented using software, the software may be stored in a computer-readable medium and loaded into the computing system 1200 using, for example, the removable storage unit 1214, the media drive 1210 or the communications interface 1218. The control logic (in this example, software instructions or computer program code), when executed by the processor 1202, causes the processor 1202 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of transforming legacy documents to extensible markup language (XML) formats, the method comprising:
   extracting, by a document processing device, a plurality of attributes and a nature of at least one content from an intermediate structure file of a legacy document;
   transforming, by the document processing device, the intermediate structure file into a custom object model (COM) structure, wherein transforming comprises:
      classifying the intermediate structure file into one or more objects, wherein the classifying comprises:
         tagging each of the at least one content in the intermediate structure, as one or more objects, based on the respective attribute and the respective nature of each of the at least one content,
            wherein the nature provides information on precautionary information and wherein the nature is identified using artificial intelligence;
      logically grouping each of the one or more object; and
      creating a hierarchical object tree from each of the one or more objects logically grouped in accordance with the COM structure;
      wherein the one or more objects comprises: a section within the at least one content of the intermediate structure file, list items within the section of the at least one content, paragraphs within each of the list items, notes, warning or caution contents, and graphic contents within the at least one content; and
   converting, by the document processing device, the COM structure of the legacy document to an XML format in compliance with one or more industry standards using an XML serialization technique.

2. The method of claim 1, comprising:
   receiving the legacy document, wherein the legacy document is in a predefined format, and wherein the legacy document comprises at least one of industrial manual or technical publication for a product.

3. The method of claim 2, further comprising:
   converting the legacy document into the intermediate structure file, wherein the intermediate structure file corresponds to a word markup language (ML) file.

4. The method of claim 1, wherein extracting the plurality of attributes and the nature of the at least one content comprises:
   parsing at least one content of the intermediate structure file associated with the legacy document; and
   identifying the nature and the plurality of attributes from of each of the at least one content based on parsing, wherein the plurality of attributes comprises heading of the at least one content, sub-heading of the at least one content, type of header and footer used within the at least one content, number of tables within the at least one content, numbered lists within the at least one content, number of figures within the at least one content, and type of formatting used within the at least one content.

5. The method of claim 1, wherein the one or more industry standards comprises at least one of: iSpec 2200 Air Transport Association (ATA) standard, AeroSpace and Defense (ASD) S1000D standard, Military (MIL) standard, or Darwin Information Typing Architecture (DITA) standard.

6. The method of claim 1, wherein converting the COM structure of the legacy document to the XML format in compliance with the one or more industry standards comprises:
   generating a .NET object file for each of the hierarchical object tree created in accordance with the COM structure; and
   transforming the .NET object file associated with the COM structure to the XML format in compliance with the one or more industry standards using the XML serialization technique.

7. A system of transforming legacy documents to extensible markup language (XML) formats, the system comprising:
   a processor and a memory communicatively coupled to the processor, wherein the memory stores processor-executable instructions, which, on execution, causes the processor to:
      extract a plurality of attributes and a nature of at least one content from an intermediate structure file of a legacy document;
      transform the intermediate structure file into a custom object model (COM) structure, wherein to transform intermediate structure file, the processor instructions, on execution, further cause the processor to:
         classify the intermediate structure file into one or more objects, wherein the classifying comprises:
            tagging each of the at least one content in the intermediate structure, as one or more objects, based on the respective attribute and the respective nature of each of the at least one content, wherein the nature provides information on precautionary information and wherein the nature is identified using artificial intelligence;
         logically group each of the one or more objects; and
         create a hierarchical object tree from each of the one or more objects logically grouped in accordance with the COM structure;
         wherein the one or more objects comprises: a section within the at least one content of the intermediate structure file, list items within the section of the at least one content, paragraphs within each of the list items, notes, warning or caution contents, and graphic contents within the at least one content; and
      convert the COM structure of the legacy document to an XML format in compliance with one or more industry standards using an XML serialization technique.

8. The system of claim 7, wherein the processor instructions, on execution, further cause the processor to receive the legacy document, wherein the legacy document is in a predefined format, and wherein the legacy document comprises at least one of industrial manual or technical publication for a product.

9. The system of claim 8, wherein the processor instructions, on execution, further cause the processor to:
convert the legacy document into the intermediate structure file, wherein the intermediate structure file corresponds to a word markup language (ML) file.

10. The system of claim 7, wherein to extract the plurality of attributes and the nature of the at least one content, the processor instructions, on execution, further cause the processor to:
parse at least one content of the intermediate structure file associated with the legacy document; and
identify the nature and the plurality of attributes of each of the at least one content based on parsing, wherein the plurality of attributes comprises heading of the at least one content, sub-heading of the at least one content, type of header and footer used within the at least one content, number of tables within the at least one content, numbered lists within the at least one content, number of figures within the at least one content, and type of formatting used within the at least one content.

11. The system of claim 7, wherein the one or more industry standards comprises at least one of: iSpec 2200 Air Transport Association (ATA) standard, AeroSpace and Defense (ASD) S1000D standard, Military (MIL) standard, or Darwin Information Typing Architecture (DITA) standard.

12. The system of claim 7, wherein to convert the COM structure of the legacy document to the XML format in compliance with the one or more industry standards, the processor instructions, on execution, further cause the processor to:
generate a .NET object file for each of the hierarchical object tree created in accordance with the COM structure; and
transform the .NET object file associated with the COM structure to the XML format in compliance with the one or more industry standards using the XML serialization technique.

13. A computer program product for transforming legacy documents to extensible markup language (XML) formats, the computer program product embodied in a non-transitory computer readable storage medium and comprising computer-executable instructions configured for:
extracting a plurality of attributes and a nature of at least one content from an intermediate structure file of a legacy document;
transforming the intermediate structure file into a custom object model (COM) structure, wherein transforming comprises:
classifying the intermediate structure file into one or more objects, wherein the classifying comprises:
tagging each of the at least one content in the intermediate structure, as one or more objects, based on the respective attribute and the respective nature of each of the at least one content,
wherein the nature provides information on precautionary information and wherein the nature is identified using artificial intelligence;
logically grouping each of the one or more objects; and
creating a hierarchical object tree from each of the one or more objects logically grouped in accordance with the COM structure;
wherein the one or more objects comprises: a section within the at least one content of the intermediate structure file, list items within the section of the at least one content, paragraphs within each of the list items, notes, warning or caution contents, and graphic contents within the at least one content; and
converting the COM structure of the legacy document to an XML format in compliance with one or more industry standards using an XML serialization technique.

14. The computer program product of claim 13, wherein the computer instructions further configured for receiving the legacy document, wherein the legacy document is in a predefined format, and wherein the legacy document comprises at least one of industrial manual or technical publication for a product.

15. The computer program product of claim 14, wherein the computer instructions further configured for converting the legacy document into the intermediate structure file, wherein the intermediate structure file corresponds to a word markup language (ML) file.

16. The computer program product of claim 13, wherein the computer instructions further configured for extracting the plurality of attributes and the nature of the at least one content by:
parsing at least one content of the intermediate structure file associated with the legacy document; and
identifying the nature and the plurality of attributes of each of the at least one content based on parsing, wherein the plurality of attributes comprises heading of the at least one content, sub-heading of the at least one content, type of header and footer used within the at least one content, number of tables within the at least one content, numbered lists within the at least one content, number of figures within the at least one content, and type of formatting used within the at least one content.

17. The computer program product of claim 13, wherein the computer instructions further configured for converting the COM structure of the legacy document to the XML format in compliance with the one or more industry standards by:
generating a .NET object file for each of the hierarchical object tree created in accordance with the COM structure; and
transforming the .NET object file associated with the COM structure to the XML format in compliance with the one or more industry standards using the XML serialization technique, wherein the one or more industry standards comprises at least one of: iSpec 2200 Air Transport Association (ATA) standard, AeroSpace and Defense (ASD) S1000D standard, Military (MIL) standard, or Darwin Information Typing Architecture (DITA) standard.

* * * * *